May 27, 1947.　　　　H. BIBICOFF　　　　2,421,050
CLUTCH ACTUATOR
Filed Nov. 26, 1945
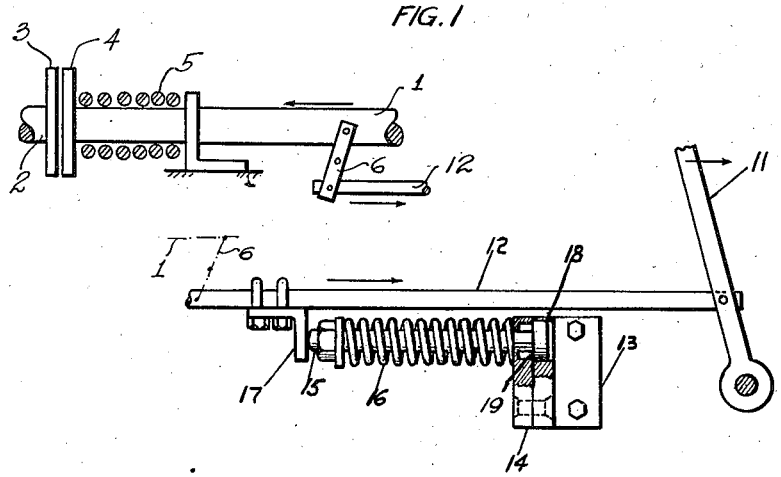
FIG. 1
FIG. 4
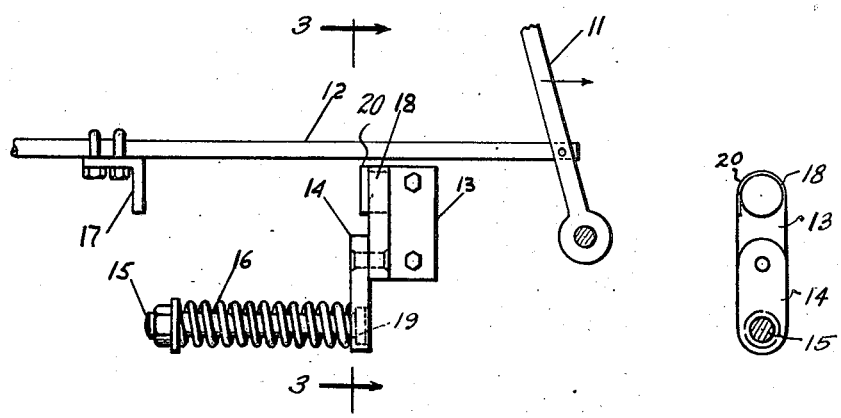
FIG. 2　　　　　　　　　　FIG. 3
INVENTOR.
BY　Hilarion Bibicoff
Daniel G. Cullen
atty Patented May 27, 1947

2,421,050

UNITED STATES PATENT OFFICE 2,421,050

CLUTCH ACTUATOR

Hilarion Bibicoff, Belleville, Mich.

Application November 26, 1945, Serial No. 630,789

5 Claims. (Cl. 192—114)

This application relates to clutches and more particularly to devices for neutralizing engaging springs of clutches.

In certain apparatus, a clutch is used to connect a driven shaft to a driving shaft and a clutch spring normally causes clutch engagement, with disengagement being enabled only by the continued personal application by the operator of a disengaging force on a clutch disengaging means to overcome the engaging spring and cause clutch disengagement. Generally, clutch disengagement is momentary only and the application of a disengaging force is but momentary so that the clutch is engaged practically all the time, being engaged except for the few moments when the operator personally causes and maintains disengagement. In such devices, no means are provided to hold the clutch disengaged and thus the operator is required to exercise a disengaging force during all the time that he wants the clutch to be disengaged.

This application discloses a device which can be utilized to overcome the clutch engaging spring and thus cause the clutch to remain disengaged, the device being so constructed that though it holds the clutch disengaged, it nevertheless can be overcome by the operator whenever he desires, so that he may cause momentary clutch engagement, or clutch engagement for so long a period as he exercises and continues to exercise a force on the clutch disengaging means in reverse direction to overcome the disengaging device and enable the engaging spring to cause clutch engagement for so long as he maintains the engaging or overcoming force on the disengaging means in such reverse direction.

The device is so constructed that it can remain in an idle or ineffective position wherein it has no effect whatever upon the clutch parts so that the clutch remains of conventional form and type, normally engaged, but adapted to be disengaged by the exercise of a disengaging force by the operator. On the other hand, the device can be moved into a disengaging or neutralizing position in which case the clutch is converted by neutralization of the clutch engaging spring into a clutch system that is normally disengaged but that can be caused to be engaged only by the exercise by the operator of an overcoming or engaging force for so long as he exercises such force.

For an understanding of the device herein disclosed, reference should be had to the appended drawing.

In this drawing,

Figure 1 is a diagrammatic view of a clutch system showing the clutch as held disengaged in opposition to the normal engagement caused by the clutch engaging spring.

Figure 2 diagrammatically shows the neutralizing device in idle or ineffective position.

Figure 3 is a view as if on line 3—3 of Figure 2.

Figure 4 is a view like Figure 2, but showing the device in neutralizing position. All views show the clutch disengaged.

Figure 1 shows a driven shaft 1, adapted to be connected to a driving shaft 2, through meeting or engaging clutch faces 3—4. A clutch engaging spring 5 normally causes clutch engagement. Connected to shaft 1 through a reversing lever 6, pivoted at its center, is a personally operable disengaging means including a lever 11 and a rod 12. Figure 1 shows the clutch disengaged, but normally the clutch is engaged. Only by continued personal application of a disengaging force, in the direction opposite the arrows shown, to the lever 11, can the clutch be disengaged.

For neutralizing spring 5, and thus enabling the clutch to remain and be held disengaged, but nevertheless permitting personal manipulation of lever 11 in reverse direction to cause clutch engagement, by movement of parts 11—12, 6—1 and 4 in the direction shown by the arrows, there is provided the device now about to be described.

Such device comprises a stationarily mounted abutment or bracket 13, which pivotally mounts a plate 14 in a manner to permit the plate to swing from idle or ineffective position, Figure 2, to the position of Figure 4 where it can hold the previously disengaged clutch disengaged. In a countersunk aperture of the plate is the head of a latching rod or bolt 15 surrounded by a disengaging spring 16 whose ends act against plate 14 and the nut which forms a head for bolt 15. Spring 16 can be preloaded by the nut on bolt 15.

A bracket 17 on rod 12 coacts with one end of latch rod or bolt 15 and an aperture 18 of the bracket abutment 13 is provided to receive the other end 19 of such bolt, whereby the bolt 15 may latch the spring 16 to the abutment 13, when the plate 14 is swung to engage a stop 20 of abutment 13, Figure 4.

*Use*

When the device, 13—18, is in the idle position of Figure 2, it is ineffective, and the clutch 3—4 may be manipulated in the normal manner.

However, if the device is to be used to neutralize spring 5, the operator moves parts 11—12—6, etc., to and slightly past the clutch disengaged position shown, and swings the device to the neutralizing position, Figure 4, and then releases the disengaging force on lever 11. Parts 11—12—6 return slightly towards engaged position, until bracket 17 engages latch 15 to cause its end 19 to move into plate aperture 18 and latch spring 16 in disengaging position, where it neutralizes spring 5 and prevents clutch engagement and holds the clutch disengaged.

Thereafter the operator may personally move lever 11 in the direction of the arrows shown, to cause clutch engagement, and only by continued application of a clutch engaging force on lever 11 will he be able to overcome spring 16 and cause clutch engagement.

The engagement of head 19 in aperture 18 not only locks the spring 16 in disengaging position, but insures safety operation, since the clutch cannot be engaged unless head 19 is in aperture 18.

A practical use of the neutralizer herein disclosed is now suggested by way of example, although other examples are known and could be presented. The neutralizer could well be used in connection with door to door delivery trucks. As at present constructed, without any neutralizer, the operator must enter the vehicle, disengage the clutch, and shift gears in order to move the vehicle a short distance, and then at the end of such movement he must again disengage the clutch and move the gears to neutral, and then leave the vehicle. This is a complex operation and involves entering and leaving the vehicle, as well as several clutch disengagements and manipulation of gear shift levers even though the vehicle is to travel but a few feet. If the same vehicle were equipped with a neutralizer of the invention, and a suitable control such as a rope, were connected to the clutch disengaging foot pedal which corresponds to the lever 11 for clutch disengagement, then the operator could leave the vehicle standing with gears meshed and with the clutch remaining disengaged, and merely by a pull upon the rope connected to the lever, he would cause the clutch to engage and the vehicle to move forward. All this he could do without even entering the vehicle, merely by pulling the rope and walking alongside the vehicle. When he wishes the vehicle to stop, he merely releases the force on the rope connected to the lever 11 and this permits the clutch to disengage and the vehicle will stop.

For farm use, with tractors, the farmer can use the neutralizer and a long rope connected to the clutch disengaging pedal corresponding to lever 11 hereof and cause his tractor to move forward a short distance without even entering the vehicle. This is extremely desirable in farm use and permits a motor driven tractor to be operated without the operator entering the tractor for short movements, something that is so desirable to the farmer.

Now having described the device here shown, reference should be had to the claims which follow.

I claim:

1. For use with a clutch which is normally caused to engage by a clutch engaging spring, and which has a personally operable disengaging means connected to it for overcoming said spring and causing clutch disengagement so long as a sufficient disengaging force is personally applied to said means in one direction, a device for neutralizing said clutch spring and for holding the clutch disengaged without requiring personal maintenance of a disengaging force on said means, said device comprising a disengaging spring releasably connected to said means and reacting against a suitable abutment, said device being movable at will into and out of a clutch spring neutralizing position, and an idle position where it has no effect on the clutch spring.

2. For use with a clutch which is normally caused to engage by a clutch engaging spring, and which has a personally operable disengaging means connected to it for overcoming said spring and causing clutch disengagement so long as a sufficient disengaging force is personally applied to said means in one direction, a device for neutralizing said clutch spring and for holding the clutch disengaged without requiring personal maintenance of a disengaging force on said means, said device comprising a disengaging spring releasably connected to said means and reacting against a suitable abutment, said device being movable at will into and out of a clutch spring neutralizing position, and an idle position where it has no effect on the clutch spring, said device including a latch for holding the disengaging spring in disengaging position.

3. For use with a clutch which is normally caused to engage by a clutch engaging spring, and which has a personally operable disengaging means connected to it for overcoming said spring and causing clutch disengagement so long as a sufficient disengaging force is personally applied to said means in one direction, a device for neutralizing said clutch spring and for holding the clutch disengaged without requiring personal maintenance of a disengaging force on said means, said device comprising a disengaging spring releasably connected to said means and reacting against a suitable abutment, said device being movable at will into and out of a clutch spring neutralizing position, and an idle position where it has no effect on the clutch spring, said device, when in disengaging position, nevertheless permitting personal manipulation of the disengaging means in reverse direction to overcome the disengaging spring and to permit the clutch spring to cause clutch engagement.

4. For use with a clutch which is normally caused to engage by a clutch engaging spring, and which has a personally operable disengaging means connected to it for overcoming said spring and causing clutch disengagement so long as a sufficient disengaging force is personally applied to said means in one direction, a device for neutralizing said clutch spring and for holding the clutch disengaged without requiring personal maintenance of a disengaging force on said means, said device comprising a disengaging spring releasably connected to said means and reacting against a suitable abutment, said device being movable at will into and out of a clutch spring neutralizing position, and an idle position where it has no effect on the clutch spring, said device, when in disengaging position, nevertheless permitting personal manipulation of the disengaging means in reverse direction to overcome the disengaging spring and to permit the clutch spring to cause clutch engagement, said device including a latch for holding the disengaging spring in disengaging position.

5. For use with a clutch which is normally caused to engage by a clutch engaging spring, and which has a personally operable disengaging means connected to it for overcoming said spring and causing clutch disengagement so long as a sufficient disengaging force is personally applied to said means in one direction, a device for neutralizing said clutch spring and for holding the clutch disengaged without requiring personal maintenance of a disengaging force on said means, said device comprising a disengaging spring releasably connected to said means and reacting against a suitable abutment, said device being movable at will into and out of a clutch spring neutralizing position, and an idle position where it has no effect on the clutch spring, said device, when in disengaging position, nevertheless permitting personal manipulation of the disengaging means in reverse direction to overcome the disengaging spring and to permit the clutch spring to cause clutch engagement, said device including a latch for holding the disengaging spring in disengaging position, said device including a stationarily mounted abutment, a plate pivotally mounted thereon, a headed latching rod slidably mounted in said plate, a coiled clutch disengaging spring mounted on said rod, the parts being so mounted with respect to said means that the plate with the rod and spring on it, may be swung into position to be engaged by and hold said means in clutch disengaged position, with the disengaging spring opposing the clutch engaging spring, and with the rod latching the plate and disengaging spring to the abutment by the coaction of the rod head with the abutment.

HILARION BIBICOFF.